May 6, 1958
F. S. FLICK
2,833,312
ORIFICED FLUID FLOW CONTROLLER
Filed Oct. 26, 1955
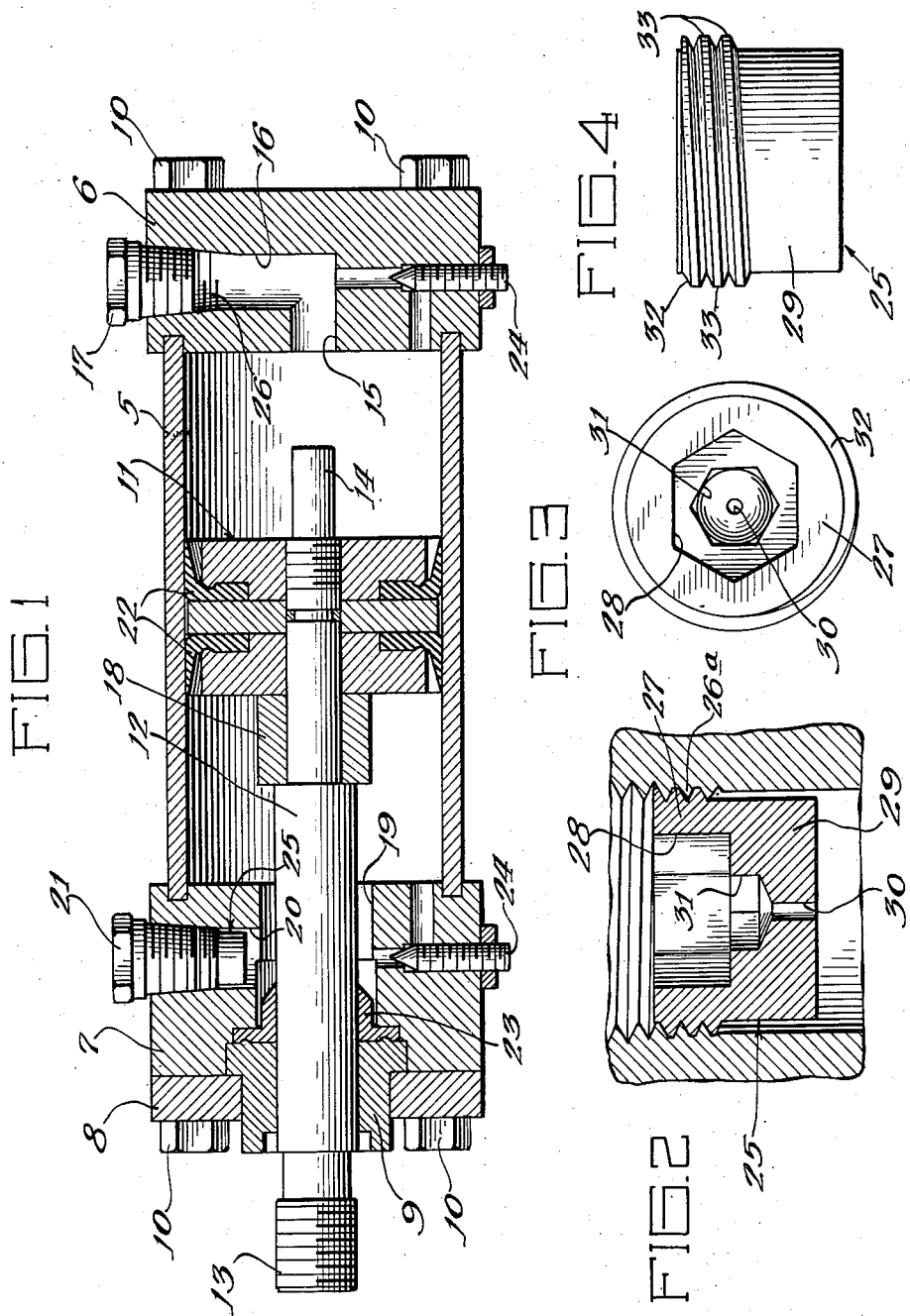
Inventor:
Francis S. Flick
By: Schroeder, Hofgren,
Brady & Wegner
Attorneys

United States Patent Office 2,833,312
Patented May 6, 1958

2,833,312

ORIFICED FLUID FLOW CONTROLLER

Francis S. Flick, Oak Park, Ill., assignor to Flick-Reedy Corporation, a corporation of Illinois Application October 26, 1955, Serial No. 542,818

2 Claims. (Cl. 138—44)

This invention relates to a flow controller and more particularly to a device for controlling the flow of motive fluid in a fluid passage such as might be used for conveying fluid to a fluid motor.

Some applications of the use of fluid motors such as piston and cylinder devices require movement of the piston rod or the cylinder at a certain specified rate. Other applications with which we are not concerned would require that the piston rod or cylinder move as rapidly as possible. The limitations on the upper range of speed are generally the rapidity with which motive fluid can be pumped into a cylinder which, in turn, is dependent upon pressure available and the size of the port openings into the cylinder.

In the past, the usual manner of obtaining flow control so as to govern the speed of movement of a piston in a cylinder has been with the use of commercially available flow control valves. In order to use such valves, they must be placed in the line leading to the piston and cylinder device. The greatest difficulty with this arrangement has been that workmen in changing the position of the cylinder or piping connections or even in dismantling a part of the equipment for repairs have forgotten to replace the flow control valve or tampered with its setting. Proper flow control for the motor has not been maintained and damage to equipment has often resulted.

The present invention provides a flow control in the form of a single member so constructed that it may be housed within a fluid port so as to provide no interference with the usual connections to the fluid motor and yet be hidden from view so as to be virtually tamperproof.

It is, therefore, the principal object of this invention to provide a new and improved fluid flow controller for a fluid motor.

Another object is to provide a fluid flow controller which may be housed within a fluid port in an unobvious manner so as to be virtually tamperproof.

A further object of the invention is to provide a fluid flow controller which may be incorporated in the fluid port of a fluid motor without interfering with the normal and usual fluid connections to the motor.

Other objects, features and advantages of the invention will be apparent from the following description of a preferred embodiment illustrated in the accompanying drawings, in which:

Figure 1 is a sectional view through the centerline of a piston and cylinder fluid motor having the invention mounted in one of the fluid ports to illustrate its location relative to the fluid motor;

Figure 2 is a fragmentary sectional view through the center of the fluid flow controller of this invention as mounted in the fluid port illustrated in Figure 1;

Figure 3 is a top plan view of the flow controller illustrated in Figure 2; and

Figure 4 is a side elevational view of the fluid flow controller illustrated in Figures 2 and 3.

The particular fluid flow controller chosen for illustration is shown in conjunction with a piston and cylinder device which may have a motive fluid of either hydraulic or pneumatic nature. The particular motor illustrated has a cylindrical barrel 5, a cap 6 at one end, a head 7 at the other end with a retainer plate 8 abutting thereagainst to hold a piston rod bushing 9 in place. The head and cap are held onto the cylindrical cylinder by tie rods extending through the cap and head and having exposed nuts 10.

A piston assembly 11 is mounted upon a piston rod 12 which extends through the bushing 9 and has a threaded outer end 13 for connection to some device to be operated by the motor. The particular piston illustrated is equipped with a cushion plunger 14 which may enter into a fluid port opening 15 formed within the cap and having communication laterally through a passage 16 to an exterior connector 17 by which an appropriate fluid line may be connected with the motor.

The particular motor illustrated is double acting in that fluid may be introduced to either side of the piston to produce movement of the piston rod. A cushion plunger 18 on the lefthand side of the piston may enter into a fluid port 19 formed in the head 7 and having communication through a lateral passage 20 in which is mounted a fitting 21 which may be similarly connected to a fluid line. Other features of the fluid motor are illustrated, however, they do not have particular applicability to the invention which is concerned only with the flow controller. The piston is provided with cup seals 22 and a flange seal 23 is provided around the piston rod. Needle valves 24 are provided for adjusting the cushioning action as the plungers enter into the fluid ports at the end of a piston rod stroke. All of these features are illustrated to explain the environment in which the fluid flow controller in its preferred form is to be used.

As mentioned above, it is sometimes important to control the rate of entry of propelling fluid into a cylinder. It is equally important that this control, once selected, remain constant and not be subject to change by workmen, either accidentally or by tinkering. As illustrated in Figure 1, each port 16 and 20 of the piston and cylinder device is provided with a coupling 17 and 21 respectively for connection to the fluid supply lines. This is normal practice with the type of cylinder illustrated. The fluid flow controller is so formed that it does not interfere in the least with the couplings 17 and 21 nor the lines which would be connected with the couplings.

For clarity of illustration, a single flow controller 25 is illustrated in position below the coupling 21 and in the fluid port 20 formed in the head member 7 at the lefthand end of the motor illustrated in Figure 1. To illustrate the inner threaded portion of the port occupied by the flow controller, the righthand port 16 formed in the cap 6 has the coupling 17 in place but no flow controller 25 positioned in the port. Below the coupling 17 are illustrated threads 26 which may be termed the "imperfect threads" formed at the end of the tap used to form the threads in the first instance. The particular flow controller 25 of this invention is so formed as to fit into the imperfect threads 26 comprising the inner threaded portion of the fluid ports.

Figures 2, 3 and 4 illustrate the particular structure of the flow controller. The controller is in the form of a metal bushing having a socket portion 27 at one end which is internally formed with a hexagonal socket 28 to receive a complementary tool. The lower or opposite end of the controller is an orifice block 29 formed with an orifice 30 therethrough communicating with the socket 28 within the socket portion. In structure, the orifice 30 has a short length connecting with a tapped portion 31 of smaller size than the socket 28. The orifice may be chosen in accordance with engineering principles to pass fluid in predetermined amounts according to the type of fluid and the pressure exerted.

As an example of one use of the present invention, an air cylinder may be attached to the valve stem of a gate valve for opening and closing purposes. It is ordinarily desirable to close the valve slowly to avoid seating the gate so tightly that it is hard to break loose on an opening stroke. Flow controllers with the proper orifice size are placed in both ports of the air cylinder to provide the slow movement. A four-way valve at a remote location is the usual means for reversing the air flow to the cylinder so that either one side or the other may be connected with a pressure supply and the other side connected to atmosphere. Since the air on the leading side of the piston must escape through the orifice in the port as the piston moves, the rate of escape will vary with the pressure. At different air pressures, the atmospheres of air within the cylinder offset the different rates of discharge so that the piston will always have about the same linear rate of travel independently of the air pressure used in the cylinder. This is of particular convenience in setting up this use of the flow controlled air cylinders, since the orifice size selected may be chosen on the basis of piston travel speed without attention to the air pressure available for operating the piston.

Another advantage of the flow controller of this invention in air cylinders is in obtaining more effective cushioning of the piston at the ends of its stroke. The orifices in the ports permit, in effect, a back pressure on the leading side of the piston of more than atmospheric pressure at the time the cushion 14 or 18 enters the respective port. This permits a pressure build up on the trapped air more rapidly to oppose the motive air pressure on the trailing side of the piston in turn providing more effective cushioning of the piston as it approaches the cylinder head. The trapped air will, of course, gradually flow out through the port and orifice permitting the piston to have full stroke travel in the cylinder.

It is important that the flow controller be sealed within the passage so that all flow in the passage must pass through the orifice 30. As mentioned above, the particular controller is so formed as to fit within the imperfect threads 26 within the fluid port. To this end the upper socket portion 27 of the body is formed with threads 32 which are less than full depth. The threads have flattened outer portions 33 which may be formed by first forming full depth threads and then grinding the outer surfaces so that the thread is less than full depth. In such form, the threads will pass into the imperfect threads 26 or 26a illustrated in Figure 2 so as to seal the exterior of the controller against the fluid passage walls.

It is contemplated that in some instances the flow controller could be placed into a fluid port with other fastening means than threads 32 as illustrated. However, once the controller is installed in a fluid port, it is unlikely that a workman would be aware of its presence and thus the controller in such position is virtually tamperproof. A special tool having a hex end which would fit into the socket 28 must be used in order to remove the controller. Since it does not interfere with the normal line connections, it is very unlikely that any tampering would occur. At the same time, the controller may be removed and replaced with a similar one having a different orifice size should conditions require a different rate of flow through the fluid passage.

The foregoing detailed description has been given for clearness of understanding only, and no unnecessary limitations should be understood therefrom, for some modifications will be obvious to those skilled in the art.

I claim:

1. In a fluid operated mechanism having a fluid port internally threaded by a pipe thread tap to provide imperfect threads at the inner threaded portion and regular threads extending outwardly from the imperfect threads, a fluid flow controller, comprising: a metallic body of generally cylindrical form and having external imperfect threads for fluid-tight threaded engagement with the internal imperfect threads of the fluid port to mount said body in the inner threaded portion of said fluid port, and a socket portion in said body adapted to receive a tool for inserting the body in said inner threaded portion of the fluid port, said body having an orifice therethrough for limiting fluid flow past the body.

2. A fluid flow controller as specified in claim 1, in which the portion of the body about the socket is provided with the imperfect threads, and the rest of said body is of lesser diameter than said portion about the socket so as to extend into the fluid port beyond the inner threaded portion.

References Cited in the file of this patent

UNITED STATES PATENTS

| 1,833,216 | Hanna | Nov. 24, 1931 |
| 2,292,095 | Thumin | Aug. 4, 1942 |
| 2,294,499 | Henkall et al. | Sept. 1, 1942 |
| 2,525,626 | Stouffer | Oct. 10, 1950 |
| 2,526,709 | Tait | Oct. 24, 1950 |

FOREIGN PATENTS

| 478,566 | Germany | July 5, 1929 |